United States Patent [19]

Moriyama

[11] Patent Number: 5,457,555
[45] Date of Patent: Oct. 10, 1995

[54] OPTICAL TRANSMISSION SYSTEM

[75] Inventor: Junichi Moriyama, Kawasaki, Japan

[73] Assignee: Fujitsu Limited, Kawasaki, Japan

[21] Appl. No.: 108,756

[22] PCT Filed: Jan. 8, 1993

[86] PCT No.: PCT/JP93/00013

§ 371 Date: Sep. 2, 1993

§ 102(e) Date: Sep. 2, 1993

[87] PCT Pub. No.: WO93/14574

PCT Pub. Date: Jul. 22, 1993

[30]     Foreign Application Priority Data

Jan. 10, 1992  [JP]  Japan ..................... 4-002850

[51] Int. Cl.⁶ ..................................... H04J 14/00
[52] U.S. Cl. .................. 359/110; 359/118; 359/117; 370/16; 340/827
[58] Field of Search .................... 359/110, 115, 359/117, 118, 177; 370/13, 13.1, 16; 379/2, 4, 221, 273, 279, 272; 340/826, 827, 825.06

[56]         References Cited

U.S. PATENT DOCUMENTS

| | | | |
|---|---|---|---|
| 4,967,406 | 10/1990 | Yagi et al. | 370/16 |
| 5,010,550 | 4/1991 | Hirata | 370/16 |
| 5,069,521 | 12/1991 | Hardwick | 359/110 |
| 5,105,420 | 4/1992 | Ardon et al. | 370/16 |
| 5,218,465 | 6/1993 | Lebby et al. | 370/16 |
| 5,313,456 | 5/1994 | Sugawara | 370/16 |
| 5,327,275 | 7/1994 | Yamane et al. | 359/117 |

FOREIGN PATENT DOCUMENTS

| | | |
|---|---|---|
| 52-74211 | 6/1977 | Japan . |
| 62-16640 | 1/1987 | Japan . |
| 1286645 | 11/1989 | Japan . |

*Primary Examiner*—Robert Raevis
*Assistant Examiner*—Richard A. Moller
*Attorney, Agent, or Firm*—Greer, Burns & Crain, Ltd.

[57]         ABSTRACT

An optical transmission system allows quick switching to protection side transmitting and receiving circuits by providing sub optical or subsidiary transmitting and receiving circuits for each current side transmission unit and each protection side transmission unit. A controller or exerciser successively starts the sub optical transmitting circuits of the current side transmission units for a predetermined time when no fault is detected. When a fault is detected, the defective portion of the system is bypassed using the protection side transmission units and the sub optical transmitting and receiving circuits of the affected current side transmission units. In this manner, the time required for the received signal to stabilize is reduced to about 10 msec.

3 Claims, 4 Drawing Sheets

OPTICAL TRANSMISSION SYSTEM

TECHNICAL FIELD

The present invention relates to optical transmission systems, and more particularly to an optical transmission system which relieves a fault in a current line by use of a protection line.

In optical transmission systems, one protection line is provided with respect to a plurality of current lines, and a fault in the current line is relieved by switching to the protection line. In this case, the switching to the protection line must be carried out within a short time in conformance with the standard set for the transmission circuit network.

BACKGROUND ART

FIG. 1 shows an example of a conventional system. The example shown in FIG. 1 switches from the current line to the protection line by switching an electrical signal before the multiplexing.

At a transmitting (master) side, 45 MHz signals amounting to 72 channels are input to a switching unit 11. Out of these signals, the electrical signals amounting to 36 channels are multiplexed and converted into an optical signal of 1.8 GHz per line.

The multiplexing of the electrical signals and the conversion to the optical signal are carried out in a protection side transmission unit 12 and a current side transmission unit 13. In FIG. 1, only the current side transmission unit 13 out of two current side transmission units is shown.

Optical transmission lines OF1 and OF2 respectively transmit the optical signals from the protection side transmission unit 12 and the current side transmission unit 13 to a receiving (slave) side.

The receiving (slave) side includes a protection side transmission unit 15, a current side transmission unit 16 and a switching unit 17 in correspondence with the transmitting (master) side. Normally, a communication is made via a current line which is formed by the current side transmission units 13 and 16 of the respective transmitting and receiving sides and the current optical transmission line OF2 which is connected to these current side transmission units 13 and 16.

If a fault occurs in the current line, a switching is made from the current line to a protection line by control operations of a switching controller 10 on the transmitting (master) side and a switching controller 14 on the receiving (slave) side.

That is, at the transmitting (master) side, the electrical signals which amount to 36 channels and are connected from the switching unit 11 to the current side transmission unit 13 are switched one channel at a time and successively connected to the protection side transmission unit 12. Similarly, at the receiving (slave) side, the electrical signals which amount to 36 channels and are connected to the current side transmission unit 16 are switched one channel at a time and successively connected to the protection side transmission unit 15. Accordingly, the optical signal which is transmitted from the protection side transmission unit 12 via the protection transmission line OF1 is converted into electrical signals in the protection side transmission unit 15, and output via the switching unit 17.

Hence, in the case of the conventional system shown in FIG. 1, the switching between the current and protection sides is made in a state before the electrical signals are multiplexed. The switching is made one channel at a time at each of the switching units 11 and 17, and the application of this system to a high-speed synchronized network is difficult because it takes considerable time to carry out the switching.

Accordingly, there is a proposal to carry out the switching of the lines in a state where the signal is already a multiplexed optical signal, as shown in FIG. 2. In FIG. 2, the protection side transmission unit 12 on the transmitting side is coupled to an optical transmission line OF3, an optical coupler (OC) 18, the current side transmission unit 13, and a plurality of current side transmission units of the subsequent stations which are not shown. Similarly, the protection side transmission unit 15 on the receiving side is coupled to the current side transmission unit 16 and a plurality of current side transmission units of the subsequent stations which are not shown, via an optical transmission line OF4 and an optical coupler 19. Thus, a plurality of current lines exist with respect to one protection line.

If a fault occurs in one current line, an optical signal of 1.8 GHz or the like and multiplexed by the current side transmission unit is guided to the protection side transmission unit 12 via the optical transmission line OF3 under the control of the transmitting (master) side switching controller 10, and is sent to the receiving (slave) side via the protection optical transmission line OF1.

At the receiving (slave) side, the optical signal sent via the protection side optical line OF1 is received via the protection side transmission unit 45 under the control of the switching controller 44.

In the case of the example shown in FIG. 2, an optical receiver (not shown) for receiving an incoming optical signal from the optical transmission line OF3 of the protection side transmission unit 12, suddenly receives the switched optical signal from a state where no signal is received. In this case, it takes approximately 100 msec until the received light stabilizes and an optical signal which is pulled into synchronism is guided to the protection optical transmission line OF1.

On the other hand, according to the SONET standard which is set for the optical transmission systems of synchronized networks employed in the United States and the like, the switching time to the protection line is prescribed as 50 msec or less. Hence, even if the optical signal can be switched directly, there was a problem in that it is difficult to switch the line within the time prescribed under the SONET standard.

Accordingly, it is an object of the present invention to provide a novel and useful optical transmission system in which the above described problem is eliminated.

In addition, it is also an object of the present invention to provide an optical transmission system which can reduce the current/protection switching time and satisfy the switching time prescribed under the SONET standard.

Further, it is an object of the present invention to provide an optical transmission system which can detect the line quality between a protection side transmission unit and each of a plurality of current side transmission units.

DISCLOSURE OF THE INVENTION

The above described objects are achieved by an optical transmission system which has one protection side transmission unit and a plurality of current side transmission units in each of a transmitting side and a receiving side, and transmits an optical signal between the transmitting side and the receiving side by coupling main optical transmitting and receiving circuits of each of the protection side transmission unit and the plurality of current side transmission units to an optical transmission line. The system includes:

an optical transmission line which couples optical signals output from sub optical transmitting circuits of the respective plurality of current side transmission units and supplies an optical signal to a sub optical transmitting circuit of the protection side transmission unit on the transmitting side, and supplies an optical signal output from a sub optical transmitting circuit of the protection side transmission unit to sub optical receiving circuits of the plurality of current side transmission units on the receiving side, and control means for operating one of the sub optical receiving circuits of the plurality of current side transmission units in a normal state in which no fault exists in the plurality of current side transmission units.

BEST MODE OF CARRYING OUT THE INVENTION

Figure 1:
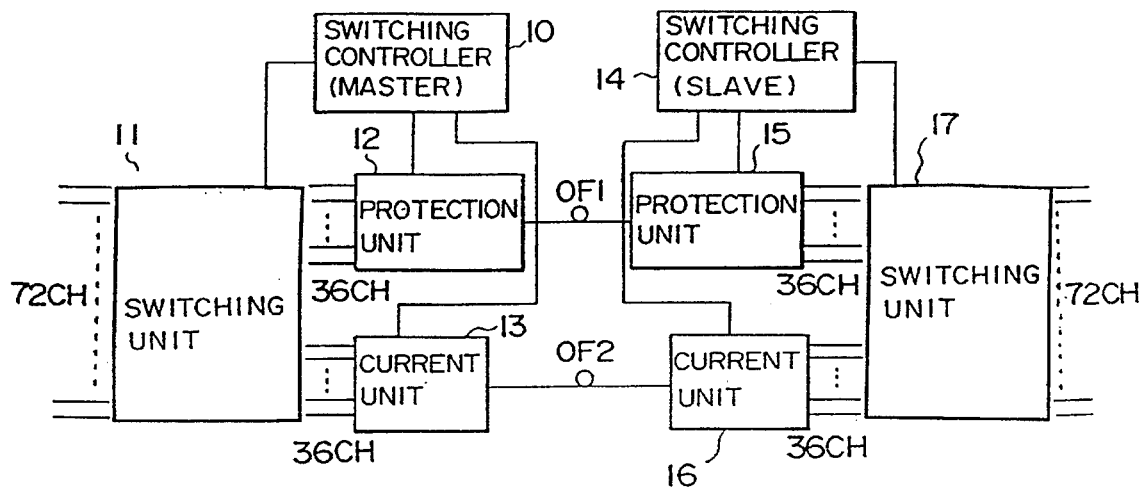
FIG. 1 is a structural diagram of a conventional system.
Figure 2:
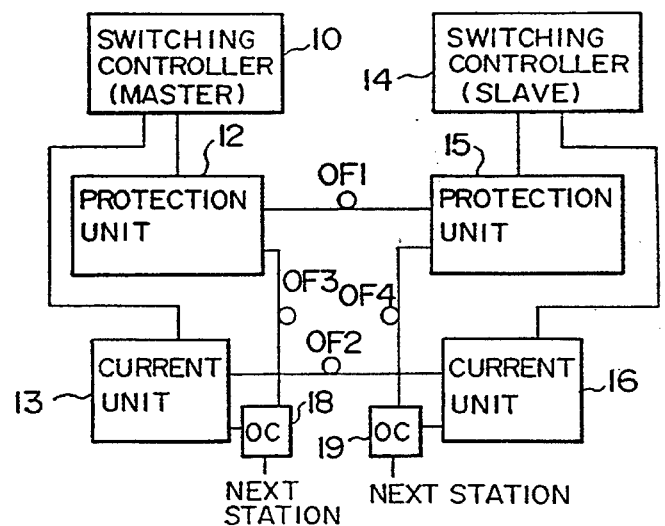
FIG. 2 is a structural diagram of a conventional system.
Figure 3:
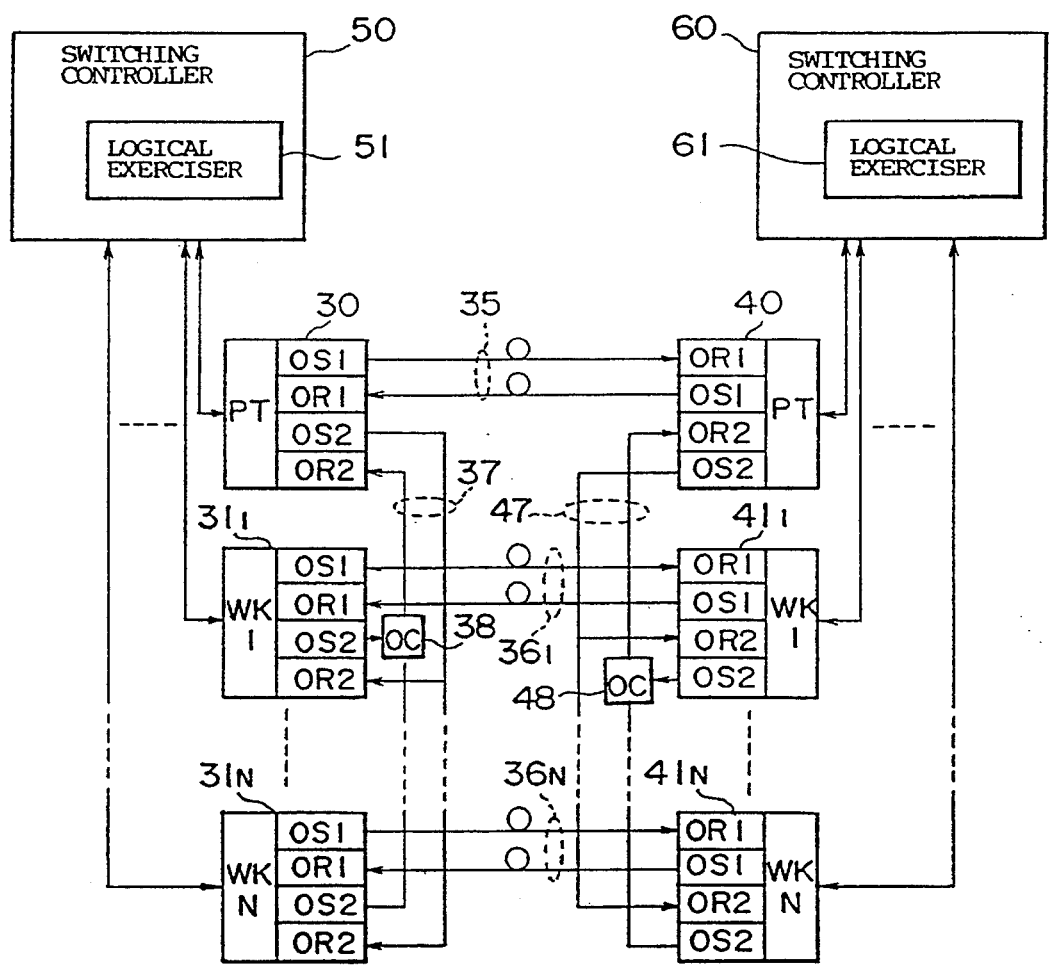
FIG. 3 is a structural diagram of a system according to the present invention.

FIG. 3 is a structural diagram of an embodiment of the system according to the present invention.

In FIG. 3, a transmission unit 30 is provided on the transmitting (master) side of the protection line, and a transmission unit 40 is provided on the receiving (slave) side of the protection line. An upstream and downstream optical transmission line pair 35 is coupled to a main optical transmitting circuit OS1 of the protection side transmission unit 30 and to a main optical receiving circuit OR1 of the protection side transmission unit 40.

The protection side transmission unit 30 further has a sub optical transmitting circuit OS2 and a sub optical receiving circuit OR2 for exchanging optical signals with current side transmission units $31_1$ through $31_N$, and the protection side transmission unit 40 further has a sub optical transmitting circuit OS2 and a sub optical receiving circuit OR2 for exchanging optical signals with current side transmission units $41_1$ through $41_N$.

N (for example, N=7) current side transmission units are provided on each of the transmitting (master) side and the receiving (slave) side, and the construction of these current side transmission units is the same as that of the protection side transmission units 30 and 40. The current side transmission unit multiplexes electrical signals amounting to 48 channels and converts the multiplexed signal into an optical signal of 2.4 GHz per line. In addition, the current side transmission unit demultiplexes the received optical signal of 2.4 GHz into electrical signals amounting to 48 channels.

In FIG. 3, the main optical transmitting circuit OS1 and the main optical receiving circuit OR1 of the current side transmission unit $31_1$ (transmitting side) and the main optical receiving circuit OR1 and the main optical transmitting circuit OS of the current side transmission unit $41_1$ (receiving side) are coupled via an upstream and downstream optical transmission line pair $36_1$. Similarly for the other current side transmission units, the main optical transmitting circuit OS1 and the main optical receiving circuit OR1 of the current side transmission unit $31_N$ (transmitting side) and the main optical receiving circuit OR1 and the main optical transmitting circuit OS1 of the current side transmission unit $41_N$ (receiving side) are coupled via an upstream and downstream optical transmission line pair $36_N$.

An optical transmission line 37 couples the sub optical transmitting circuit OS2 of the protection side transmission unit 30 on the transmitting (master) side to the sub optical receiving circuits OR2 of the current side transmission units $31_1$ through $31_N$, and also couples the sub optical receiving circuit OR2 of the protection side transmission unit 30 to the sub optical transmitting circuits OS2 of the current side transmission units $31_1$ through $31_N$.

Similarly to the optical transmission line 37, an optical transmission line 47 couples the sub optical transmitting circuit OS2 of the protection side transmission unit 40 on the receiving (slave) side to the sub optical receiving circuits OR2 of the current side transmission units $41_1$ through $41_N$, and also couples the sub optical receiving circuit OR2 of the protection side transmission unit 40 to the sub optical transmitting circuits OS2 of the current side transmission units $41_1$ through $41_N$.

An optical coupler 38 couples the optical signals from the sub optical receiving circuits OS2 of each of the current side transmission units $31_1$ through $31_N$ on the transmitting (master) side, and guides the optical signal to the optical transmission line 37. Similarly, an optical coupler 48 couples the optical signals from the sub optical receiving circuits OS2 of each of the current side transmission units $41_1$ through $41_N$ on the receiving (slave) side, and guides the optical signal to the optical transmission line 47.

A switching controller 50 controls the switching of the protection and current side transmission units 30 and $31_1$ through $31_N$ on the transmitting side. A switching controller 60 controls the switching of the protection and current side transmission units 40 and $41_1$ through $41_N$ on the receiving side.

In a normal state, the switching controllers 50 and 60 carry out control operations so that the exchange of optical signals is made between the current side transmission units $31_1$ through $31_N$ on the transmitting side and the current side transmission units $41_1$ through $41_N$ on the receiving side via optical transmission line pairs $36_1$ through $36_N$. In addition, the switching controllers 50 and 60 carry out control operations so that the optical signals are exchanged between the protection side transmission unit 30 on the transmitting side and the protection side transmission unit 40 on the receiving side via the optical transmission line pair 35.

Figure 4:
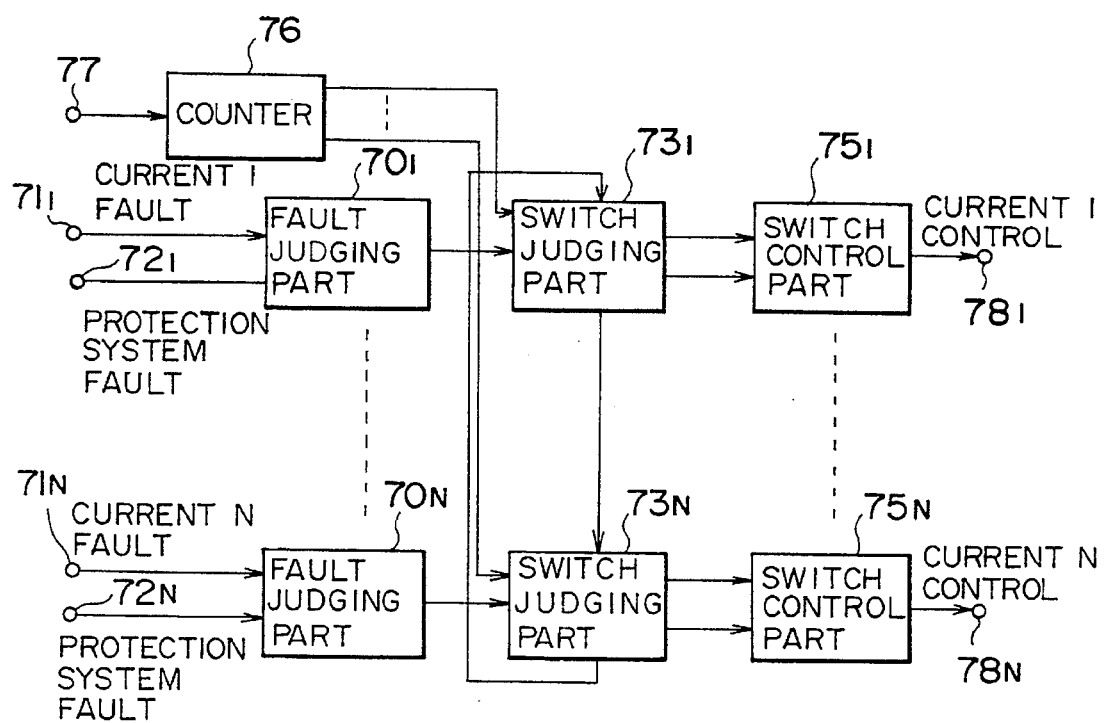
FIG. 4 is a structural diagram of a logical exerciser.

The switching controller 50 has a built-in logical exerciser 51, and the switching controller 60 has a built-in logical exerciser 61. The logical exercisers 51 and 61 have the same construction which is shown in FIG. 4. A description will be given by taking the logical exerciser 51 as an example. Fault judging parts $70_1$ through $70_N$ are provided in correspondence with the current side transmission units $31_1$ through $31_N$. An alarm signal which assumes a high level if a fault occurs in the sub optical transmitting circuit OS2 of the current side transmission units $31_1$ through $31_N$ is input to the corresponding fault judging parts $70_1$ through $70_N$ via respective terminals $71_1$ through $71_N$. In addition, an alarm signal which assumes a high level if a fault occurs in the sub optical receiving circuit OR2 of the protection side transmission unit 30 is input to the fault judging parts $70_1$ through $70_N$ via respective terminals $72_1$ through $72_N$. If one of the alarm signals input to the terminals $71_1$ and $72_1$ has a high level and indicates a fault, the fault judging part $70_1$ supplies this alarm signal to a corresponding switch judging part $73_1$, and such an operation is similarly carried out by the fault judging parts $70_2$ through $70_N$ for the alarm signals input to the terminals $71_2$ through $71_N$ and $72_2$ through $72_N$ with respect to corresponding switch judging parts $73_2$ through $73_N$.

The switch judging parts $73_1$ and $73_2$ through $73_N$ respectively receive the preceding-stage alarm signals output from the switch judging parts $73_N$ and $73_1$ through $73_{N-1}$, and loops are formed thereby. The switch judging parts $73_1$ and $73_2$ through $73_N$ each generate a low-level switch-back signal if a high-level alarm signal is received from the corresponding fault judging parts $70_1$ through $70_N$. The switch judging parts $73_1$ and $73_2$ through $73_N$ each generate a switching signal if a high-level preceding-stage alarm signal is received from the corresponding switch judging parts $73_N$ and $73_1$ through $73_{N-1}$ of the preceding stages or, a high-level switching signal is received from a counter 76 which will be described later. The switch judging parts $73_1$ through $73_N$ supply the switch-back signals and the switching signals to corresponding switch control parts $75_1$ through $75_N$. In addition, each switch judging part generates the preceding-stage alarm signal from the alarm signal which is received from the corresponding fault judging part and the switching signal which is received from the counter 76, and supplies this alarm signal to the switch judging part in the next stage.

The counter 76 counts an internal clock of the switching controller 50 which is received via a terminal 77, and generates a high-level switching signal for every predetermined time (for example, 1 hour). This high-level switching signal is successively supplied to the switch judging parts $73_1$ through $73_N$ and the switch control parts $75_1$ through $75_N$.

If the switch control parts $75_1$ through $75_N$ receive the switching signal from the counter 76 or the switching signals from the corresponding switch judging parts $73_1$ through $73_N$, the switch control parts $75_1$ through $75_N$ instruct the start of the sub optical transmitting circuit OS2 of the corresponding current side transmission units $31_1$ through $31_N$. On the other hand, if the switch control part receives the switch-back signal from the corresponding switch judging part, the switch control part generates a control signal which instructs the sub optical transmitting circuit OS2 of the corresponding current side transmission units $31_1$ through $31_N$ to stop. The control signals generated from the switch control parts $75_1$ through $75_N$ are supplied to the corresponding current side transmission units $31_1$ through $31_N$ via respective terminals $78_1$ through $78_N$.

Figure 5:
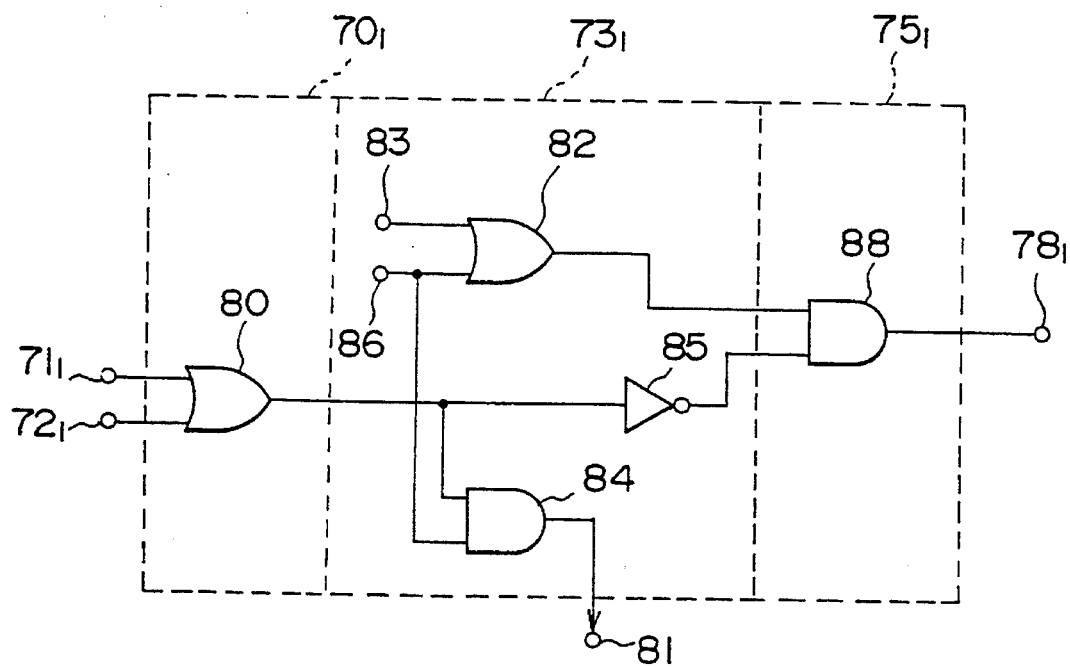
FIG. 5 is a circuit diagram of a part of the logical exerciser.

FIG. 5 shows a circuit diagram of the fault judging part $70_1$, the switch judging part $73_1$ and the switch control part $75_1$ of the logical exerciser described above. The other fault judging parts, switch judging parts and switch control parts have the same construction as those shown.

In FIG. 5, an OR circuit 80 obtains an alarm signal if one of the alarm signal from the current side transmission unit $31_1$ an the alarm signal from the protection side transmission unit 30 has a high level. An AND circuit 84 of the switch judging part $73_1$ generates the preceding-stage alarm signal based on the alarm signal from the OR circuit 80 and the switching signal which is obtained from the counter 76 via a terminal 86, and outputs this preceding-stage alarm signal via a terminal 81. An inverter 85 inverts the alarm signal from the OR circuit 80 to generate the switch-back signal, and supplies this switch-back signal to an AND circuit 88 of the switch control part $75_1$. In addition, an OR circuit 82 supplies the high-level switching signal from a terminal 86 and a high-level preceding-stage alarm signal from a terminal 83 to an AND circuit 88 of the switch control part $75_1$ as a switching signal.

The AND circuit 88 of the switch control part $75_1$ outputs a low-level control signal via the terminal $78_1$ if the switch-back signal from the inverter 85 has the low level. On the other hand, the AND circuit 88 outputs a high-level control signal via the terminal $78_1$ if a high-level switching signal is received from the OR circuit 82 in a state where the above switch-back signal has a high level. In other words, the sub optical transmitting circuit OS2 of the current side transmission unit $31_1$ operates if the signal output via the terminal $78_1$ has the high level, and this sub optical transmitting circuit OS2 stops if the signal output via the terminal $78_1$ has the low level.

Hence, the logical exerciser 51 successively starts the sub optical transmitting circuits OS2 of the current side transmission units $31_1$ through $31_N$ for every predetermined time so that the optical signals are output from these sub optical transmitting circuits OS2. When making a switching from the current side transmission unit $31_1$ to the transmission unit $31_2$, for example, the timings overlap such that the sub optical transmitting circuit OS2 of the current side transmission unit $31_1$ stops after the sub optical transmitting circuit OS2 of the current side transmission unit $31_2$ starts.

In addition, if a switching is to be made from the current side transmission unit $31_1$ to the transmission unit $31_2$ but a fault exists in the sub optical transmitting circuit OS2 of the current side transmission unit $31_2$, a switching is made to the current side transmission unit $31_3$ by bypassing the current side transmission unit $31_2$.

Accordingly, under the control of the logical exerciser 51, the optical signals from the sub optical transmitting circuits OS2 of the current side transmission units $31_1$ through $31_N$ are input to the sub optical receiving circuit OR2 of the protection side transmission unit 30 via the optical coupler 38. In other words, this sub optical receiving circuit OR2 is constantly in a state in which the optical signal can be received, and the time required for the received signal to stabilize, that is, the time until the received signal is pulled into synchronism, is reduced to approximately 10 msec.

The switching control of the sub optical transmitting circuits OS2 of the current side transmission units $41_1$ through $41_N$ is carried out similarly to the above by the logical exerciser 61.

At the same time as successively switching and operating the sub optical transmitting circuits OS2 of the current side transmission units $31_1$ through $31_N$, the optical signal is returned from the sub optical transmitting circuit OS1 of the protection side transmission unit 30 to the sub optical receiving circuits OR2 of the N current side transmission units $31_1$ through $31_N$.

Accordingly, in the protection side transmission unit 30, it is possible to detect the line quality state between the protection side transmission unit 30 and each of the current side transmission units $31_1$ through $31_N$.

As a result, a precise line switching can be made by the switching controller 50 which is notified of each line quality based on a major alarm state having an error rate of $10^{-3}$ or $10^{-4}$, for example, and a minor alarm state having an error rate of $10^{-6}$ to $10^{-9}$, for example.

In the above described embodiment, it is possible to increase the optical signal transmission speed by constantly applying a driving bias voltage to a light emitting element of the optical transmitting circuit OS2 so as to continuously output an optical signal "0".

For example, if a fault is generated in the optical transmission line pair $36_1$ in FIG. 3 and no optical signal is received by the main optical receiving circuit OR1 of the current side transmission unit $41_1$, an alarm is notified to the switching controller 60 from the current side transmission unit $41_1$. Hence, the switching controller 60 notifies the above fault to the switching controller 50 via the protection side transmission units 40 and 30.

Based on this fault notification, the switching controller 50 carries out a control so that the sub optical transmitting circuit OS2 of the current side transmission unit $31_1$ outputs the optical signal which was output from the main optical transmitting circuit OS1, and the sub optical transmitting circuits OS2 of all of the remaining current side transmission units $31_2$ through $31_N$ stop. The protection side transmission unit 30 supplies the optical signal from the current side transmission unit $31_1$ which is received by the sub optical receiving circuit OR2 to the protection side transmission unit 40 via the main optical transmitting circuit OS1.

In addition, based on the instruction transmitted from the switching controller 50 via the optical transmission line pair 35, the switching controller 60 transmits the optical signal received by the main optical receiving circuit OR1 of the protection side transmission unit 40 to the sub optical receiving circuit OR2 of the current side transmission unit $41_1$ via the optical transmission line pair 47. The switching of the optical transmission lines is carried out in this manner.

In the embodiment described above, the current side transmission units $31_1$ through $31_N$ and $41_1$ through $41_N$ are successively switched by the logical exercisers 51 and 61. However, it is also possible to carry out the switching between the current and protection sides at a high speed when the fault is generated, by respectively receiving the optical signals output from the sub optical transmitting circuits OS2 of the current side transmission units $31_1$ and $41_1$ by the sub optical receiving circuits OR2 of the protection side transmission units 30 and 40, for example. In this case, however, it is not possible to detect the line quality state between the protection side transmission unit and each of the current side transmission units.

I claim:

1. An optical transmission system comprising:

a transmitting side and a receiving side, the transmitting side and the receiving side each having a protection side transmission unit and a plurality of current side transmission units on each of said transmitting side and said receiving side, each of said protection and said current side transmission units having a main optical transmitting circuit, a main optical receiving circuit, a sub optical transmitting circuit and a sub optical receiving circuit, respective said main optical transmitting circuits of said protection side transmission unit and said current side transmission units on said transmitting side and said receiving side exchanging optical signals with corresponding said main optical receiving circuits through a plurality of first optical transmission lines, a plurality of second optical transmission lines on the transmitting side for coupling optical signals from said sub optical transmitting circuits in said current side transmission units to said sub optical receiving circuit in said protection side transmission unit, said second optical transmissions lines also coupling optical signals from said sub optical transmitting circuit in said protection side transmission unit to said sub optical receiving circuits in said current side transmission units;

a plurality of third optical transmission lines on the receiving side for coupling optical signals from said sub optical transmitting circuits in said current side transmission units of said receiving side to said sub optical receiving circuit in said protection side transmission unit on said receiving side, said third optical transmissions lines also coupling optical signals from said sub optical transmitting circuit in said protection side transmission unit on said receiving side to said sub optical receiving circuits in said current side transmission units on said receiving side;

control means connected to said protection transmission units and said plurality of current side transmission units on said transmitting side and on said receiving side for selecting one of the sub optical transmitting circuits of the plurality of current side transmission circuits periodically for a predetermined time during a normal state during which no fault exists in the plurality of current side transmission units or current side receiving units on said transmitting and said receiving sides, or in first optical transmission lines;

said control means routing the optical signals from the sub optical transmitting circuit of selected current side transmission units to said protection side transmission units when a fault is detected in the main optical transmitting or receiving circuits of said selected current side transmission units or their respective first optical transmission lines.

2. The optical transmission system as claimed in claim 1, wherein:

said control means successively selects the sub optical transmitting circuits of the current side transmission units having no fault out of said plurality of current side transmission units by bypassing a current side transmission unit having a fault in the sub optical transmitting circuit thereof.

3. The optical transmission system as claimed in claim 1, wherein:

said protection side transmission unit detects a line quality between said protection side transmission unit and said plurality of current side transmission units.

* * * * *